United States Patent
Lee

(10) Patent No.: US 11,433,962 B2
(45) Date of Patent: Sep. 6, 2022

(54) VARIABLE DAMPER SEAT POST

(71) Applicant: Sang Ill Lee, Seoul (KR)

(72) Inventor: Sang Ill Lee, Seoul (KR)

(*) Notice: Subject to any disclaimer, the term of this patent is extended or adjusted under 35 U.S.C. 154(b) by 742 days.

(21) Appl. No.: 16/343,575

(22) PCT Filed: Oct. 16, 2017

(86) PCT No.: PCT/KR2017/011359
§ 371 (c)(1),
(2) Date: Apr. 19, 2019

(87) PCT Pub. No.: WO2018/074786
PCT Pub. Date: Apr. 26, 2018

(65) Prior Publication Data
US 2020/0047834 A1     Feb. 13, 2020

(30) Foreign Application Priority Data
Oct. 20, 2016    (KR) .......................... 10-2016-0136256

(51) Int. Cl.
*B62J 1/02*     (2006.01)

(52) U.S. Cl.
CPC ...................................... *B62J 1/02* (2013.01)

(58) Field of Classification Search
CPC  B62J 1/02; B62J 1/06; B62J 1/08; B62J 1/00
See application file for complete search history.

(56) References Cited

U.S. PATENT DOCUMENTS

| 4,155,590 | A | | 5/1979 | Cunningham | |
|---|---|---|---|---|---|
| 4,275,922 | A | | 6/1981 | Juy | |
| 4,456,295 | A | * | 6/1984 | Francu | B62J 1/02 297/211 |
| 4,987,764 | A | * | 1/1991 | Chen | B62J 1/08 72/370.12 |
| 5,020,851 | A | * | 6/1991 | Chen | B62J 1/08 297/215 |
| 5,226,624 | A | * | 7/1993 | Kingsbery | B62J 1/08 248/219.2 |

(Continued)

FOREIGN PATENT DOCUMENTS

| FR | 2729631 A1 | * | 7/1996 | ................ B62J 1/02 |
|---|---|---|---|---|
| FR | 2729631 A1 | | 7/1996 | |

(Continued)

*Primary Examiner* — Tony H Winner
*Assistant Examiner* — Michael R Stabley
(74) *Attorney, Agent, or Firm* — Maschoff Brennan

(57) ABSTRACT

The present invention aims to provide a variable damper seat post, which comprises: a damper base provided at an upper end portion of a post; a seat connecting body disposed on the damper base of the post and coupled to a seat on which buttocks of a passenger are seated; a fixing unit for fixing the seat connecting body to the damper base; and a damper, interposed between the damper base and the seat connecting body, for varying positions of the seat depending on the movement of the buttocks on the seat, wherein the damper is composed of an elastic member that is pressed when a pressing force is applied and returns back to its original shape when the pressing force is released, and is interposed between the damper base and the seat connecting body.

8 Claims, 21 Drawing Sheets

(56) References Cited

U.S. PATENT DOCUMENTS

| | | | | |
|---|---|---|---|---|
| 5,501,506 A * | 3/1996 | Kao | ................ | B62J 1/10 |
| | | | | 297/215.15 |
| 5,649,738 A * | 7/1997 | Thomson | ................ | B62J 1/08 |
| | | | | 297/217.2 |
| 5,664,829 A * | 9/1997 | Thomson | ................ | B62J 1/08 |
| | | | | 297/215.14 |
| 7,559,603 B1 * | 7/2009 | Chiang | ................ | B62J 1/08 |
| | | | | 297/215.14 |
| 7,559,604 B2 * | 7/2009 | Beaulieu | ................ | B62J 1/08 |
| | | | | 297/215.14 |
| 8,226,058 B2 * | 7/2012 | Chen | ................ | B62J 1/08 |
| | | | | 297/215.14 |
| 8,814,264 B2 * | 8/2014 | Bourgeois | ................ | B62J 1/08 |
| | | | | 297/215.14 |
| 8,905,473 B2 * | 12/2014 | Hsu | ................ | B62J 1/08 |
| | | | | 297/215.14 |
| 9,550,538 B2 * | 1/2017 | Henderson | ................ | B62J 1/08 |
| 9,573,642 B2 * | 2/2017 | Liao | ................ | B62J 1/08 |
| 10,179,622 B2 * | 1/2019 | Hermansen | ................ | B62J 1/08 |
| 2015/0217824 A1 * | 8/2015 | Liao | ................ | B62J 1/02 |
| | | | | 297/214 |

FOREIGN PATENT DOCUMENTS

| | | | |
|---|---|---|---|
| JP | 6050300 Y2 | 12/1994 | |
| JP | 2010241431 A | 10/2010 | |

* cited by examiner hw1 < hw hw2 < hw

VARIABLE DAMPER SEAT POST

TECHNICAL FIELD

The present invention relates to a new conceptual variable damper seat post to which a variable damper is attached to cause a bicycle saddle to move in response to movement of a cyclist who rides a bicycle in consideration of the fact that the coupled state between the cyclist and the saddle varies because the saddle is fixed stationary but the cyclist moves during cycling, and due to this, the cyclist may suffer from various discomforts such as so-called saddle pain and friction between the thigh and the saddle while riding the bicycle. The present invention relates generally to a variable damper seat post (hereinafter also referred to as a saddle pillar) employed as a bicycle saddle pillar.

BACKGROUND ART

In general, the dictionary meaning of a bicycle saddle pillar is "a thing designed to hold a seat that supports the buttocks when a person rides a bicycle". The function of the bicycle saddle pillar is to couple a saddle to a frame and hold the saddle to allow a person to step on pedals in a sitting position on the saddle during cycling.

Cycling is exercise in which the center of gravity of a cyclist alternately moves leftward and rightward, but all existing bicycle saddle pillars adopt a method of statically fixing a saddle without movement. Due to this, the left hip bone is separated from the saddle when the person steps on the pedal with the right leg during cycling but collides against the top of the saddle while applying pushing force thereto when the person steps on the pedal with the left leg. This phenomenon repeatedly and alternately occurs at the left and right hip bones, thus causing pain of the hip bones or so-called saddle pain. Moreover, friction is generated while the left and right hip bones alternately collide against the saddle, which causes the loss of pedaling force and premature wear on pants. Since such friction is continuously generated during pedaling (an operation of stepping on the pedals), the resulting unnatural pedaling causes a reduction in the number of revolutions per minute of a crank. In addition, the cyclist may suffer from pain and fatigue accumulation when vibrations are transmitted continuously from an irregular road surface to the cyclist. For these reasons, there is an urgent need for a variable damper saddle pillar which enables a bicycle saddle to move in response to movement of a cyclist so as to eliminate the aforementioned problems.

DISCLOSURE

Technical Problem

Therefore, the present invention has been made in view of the above problems, and it is an object of the present invention to provide a new conceptual variable damper seat post which enables a bicycle saddle to respond to movement of a cyclist, thereby allowing the cyclist to ride a bicycle without pain or injury, contributing to improvement in cycling speed owing to natural pedaling, and being helpful to pedaling posture correction. In particular, by ensuring that the saddle smoothly moves in response to movement of the buttocks and muscles therearound depending on pedaling while the cyclist continuously steps on the pedals in a sitting posture on the saddle, the present invention may prevent pain and injury caused when the buttocks and muscles therearound successively collide against the saddle and may achieve not only improvement in cycling speed owing to natural pedaling but also pedaling posture correction.

Technical Solution

In accordance with an aspect of the present invention to achieve the above-described object, provided is a variable damper seat post including a damper base forming an upper end portion of a post, a seat connecting body coupled to a seat on which buttocks of a cyclist are placed, the seat connecting body being disposed above the damper base of the post, a fixing unit configured to fix the seat connecting body to the damper base, and a damper interposed between the damper base and the seat connecting body to cause a position of the seat to be varied in response to movement of the buttocks in a state in which the buttocks are placed on the seat.

By inserting the variable damper, which is formed of a flexible material such as rubber, elastomer, or any other elastic material that is capable of absorbing vibration transmitted from a road surface while supporting the weight of the cyclist, between a saddle rail fixing device lower frame and the top of a saddle pillar, the right side of the variable damper causes a saddle in a horizontal state to move such that the right side of the saddle tilts downward and a front portion of the saddle pivots rightward in response to movement of the cyclist who steps on a pedal with their right leg and presses the saddle with their thigh, whereas the left side of the variable damper causes the saddle in the horizontal state to move such that the left side of the saddle tilts downward and the front portion of the saddle pivots leftward in response to movement of the cyclist who steps on a pedal with their left leg and presses the saddle with their thigh. With this movement of the saddle, the saddle is continuously in contact with the ischial tuberosity, and thus no pain is caused since pedaling is performed without collision between the saddle and the ischial tuberosity, unlike a conventional fixed saddle which causes pain due to collision with the ischial tuberosity since the ischial tuberosity alternately and repeatedly moves up and down on the saddle during pedaling. Moreover, friction is generated while the left and right hip bones alternately collide against the fixed saddle, which causes the loss of pedaling force and premature wear on pants. Since such friction is continuously generated during pedaling, the resulting unnatural pedaling causes a reduction in the number of revolutions per minute of a crank. In addition, the cyclist may suffer from pain and fatigue accumulation when vibrations are transmitted continuously from an irregular road surface to the cyclist. The present invention relates to a new conceptual variable damper saddle pillar which enables a bicycle saddle to move in response to movement of a person.

According to the present invention, the damper base has a damper accommodating recess which is concave downward when viewed from the lateral side, and the damper has a lower intermediate damper portion which has a hemispherical shape when viewed from the lateral side, so that the intermediate damper portion of the damper is fitted into the damper accommodating recess in the damper base.

The damper base has a support block recess, and the damper is provided on the lower surface thereof with a support block, so that the support block is fitted into the support block recess.

The support block of the damper is a block having a rectangular cross-sectional shape, and at least opposite surfaces of the support block come into close contact with opposite inner surfaces of the support block recess.

The damper is formed of an elastic material, and reinforcement yarns are embedded in the damper.

Advantageous Effects

The present invention provides the following effects as a result of designing a variable damper saddle pillar in which a saddle is movable in response to movement of a cyclist unlike a conventional bicycle saddle pillar in which a saddle is fixed.

First, since the cyclist steps on the pedals in the state in which the saddle and the ischial tuberosity are continuously in contact with each other, there is no collision between the saddle and the ischial tuberosity, and thus there is no generation of pain.

Second, unlike a conventional fixed saddle against which the left and right hip bones alternately collide, and thus which causes friction, resulting in the loss of pedaling force, the variable damper saddle pillar enables pedaling without the loss of force due to friction, which results in an increase in cycling speed.

Third, in the variable damper saddle pillar, the contraction and relaxation of a variable damper is helpful to increase pedaling force by momentum, thus contributing to an increase in cycling speed.

Fourth, damage to expensive pants worn by the cyclist due to friction is reduced, which is economical.

Fifth, since the variable damper absorbs vibration transmitted from an irregular road surface, it is effective to reduce the occurrence of pain and fatigue accumulation.

Sixth, in the variable damper saddle pillar, the contraction and relaxation of the variable damper adds fun to the cyclist and increases exercise effects.

Seventh, the variable damper saddle pillar adopts a conventional saddle pillar fixing device, and thus is compatible with a general saddle.

Eighth, compared to a conventional saddle pillar, the variable damper saddle pillar of the present invention more easily moves the center of gravity of the cyclist leftward or rightward during cycling. Thus, moving the center of gravity of the cyclist to one side at the time of cornering is helpful to reduce the radius of rotation and to increase the cycling speed via stabilized posture control.

Ninth, when the cyclist steps on the pedals provided with shoe fixing clips, the lengths from the saddle to the pedals are constant. However, since every person has a slight difference in the length of both legs, continuous pedaling may cause various pain and body imbalance, for example, due to leftward or rightward twisting of the pelvis. The variable damper saddle pillar prevents the leftward or rightward twisting of the pelvis by slightly tilting the left and right sides of the horizontal saddle.

Tenth, even if the cyclist brakes during cycling, the buttocks of the cyclist are moved forward and the center of gravity of the cyclist is lowered as the saddle tilts forward. This prevents forward overturn of a bicycle. In addition, when the cyclist brakes while riding the bicycle, a rear wheel of the bicycle may fluctuate on the ground (as if a fish tail swings to the left side and to the right side) and the safety thereof is low. On the other hand, the variable damper seat post further increases the safety of the cyclist.

BEST MODE

Figure 1:
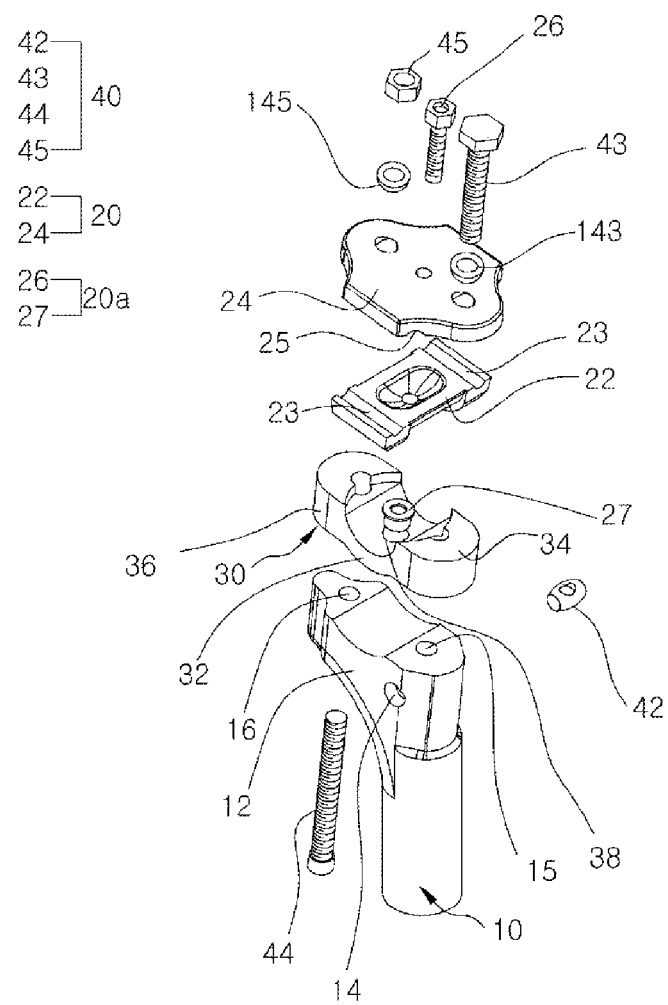
FIG. 1 is an exploded perspective view of major parts of a variable damper seat post according to the present invention.
Figure 2:
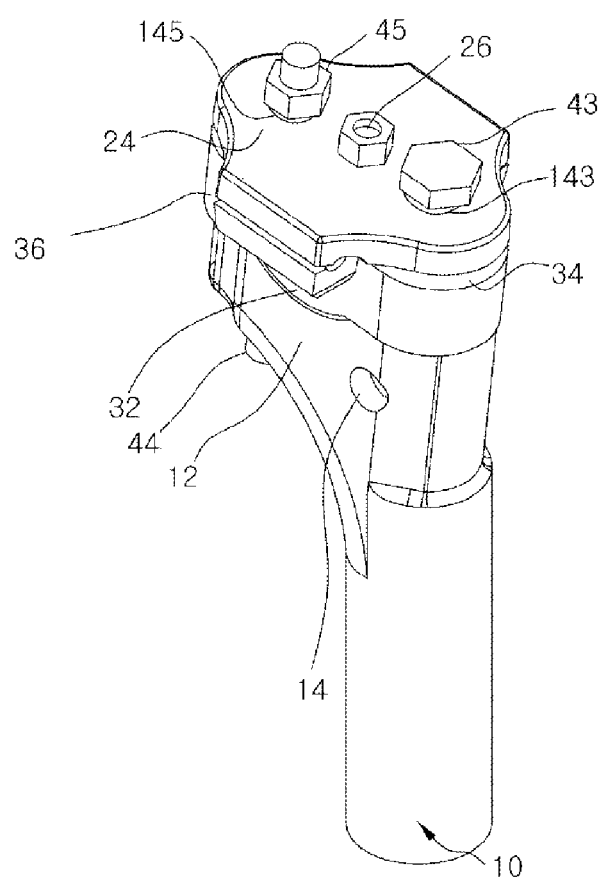
FIG. 2 is a perspective view illustrating the assembled state of the major parts illustrated in FIG. 1.
Figure 3:
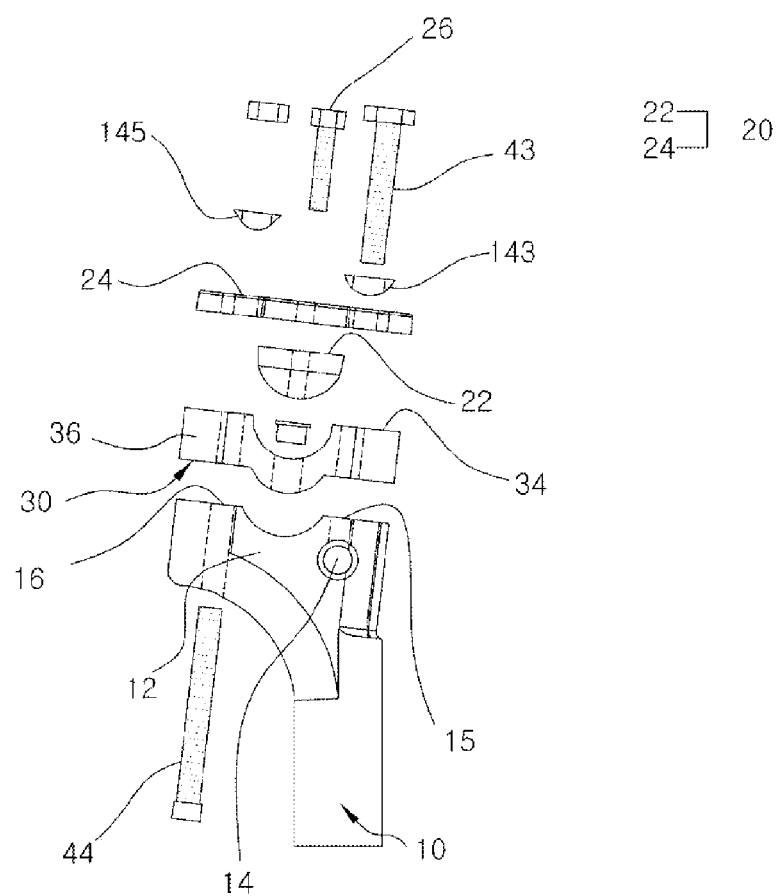
FIG. 3 is a side view illustrating the disassembled state of major parts of the variable damper seat post according to the present invention.
Figure 4:
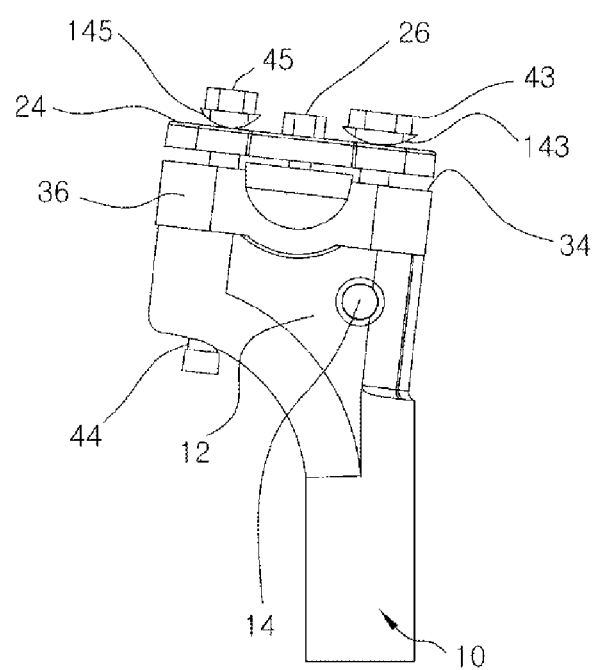
FIG. 4 is a side view illustrating the coupled state of the major parts illustrated in FIG. 3.
Figure 5:
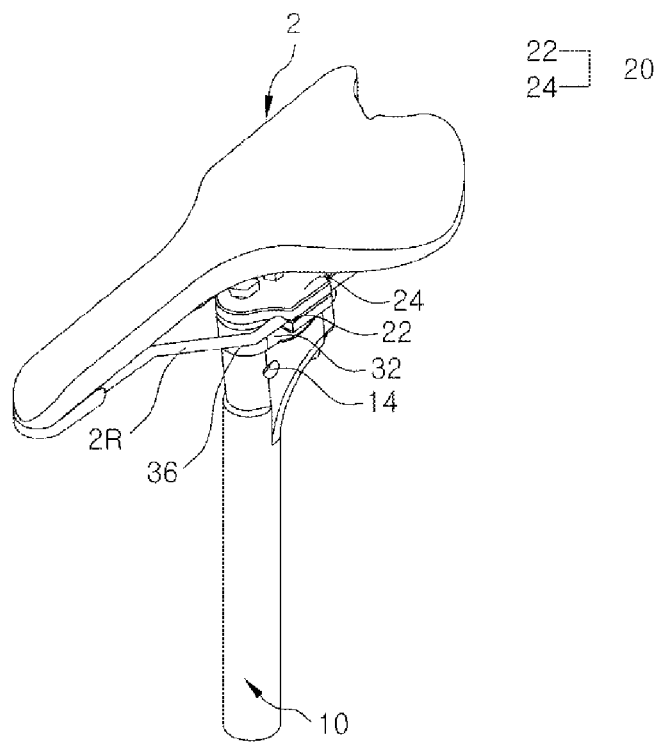
FIG. 5 is a perspective view illustrating the state in which the variable damper seat post of the present invention is coupled to a seat.
Figure 6:
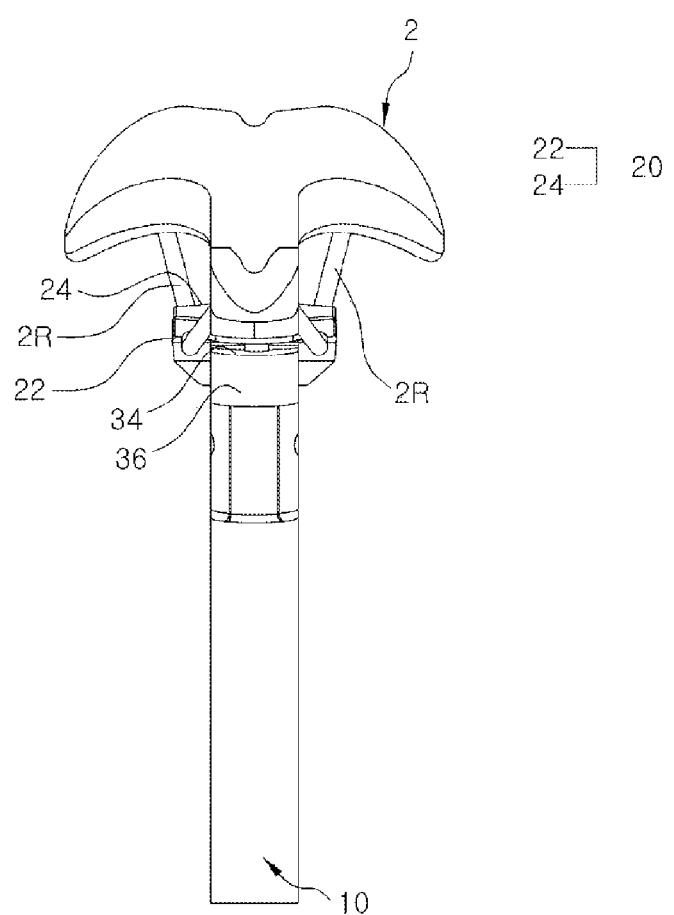
FIG. 6 is a front view of FIG. 5.
Figure 7:
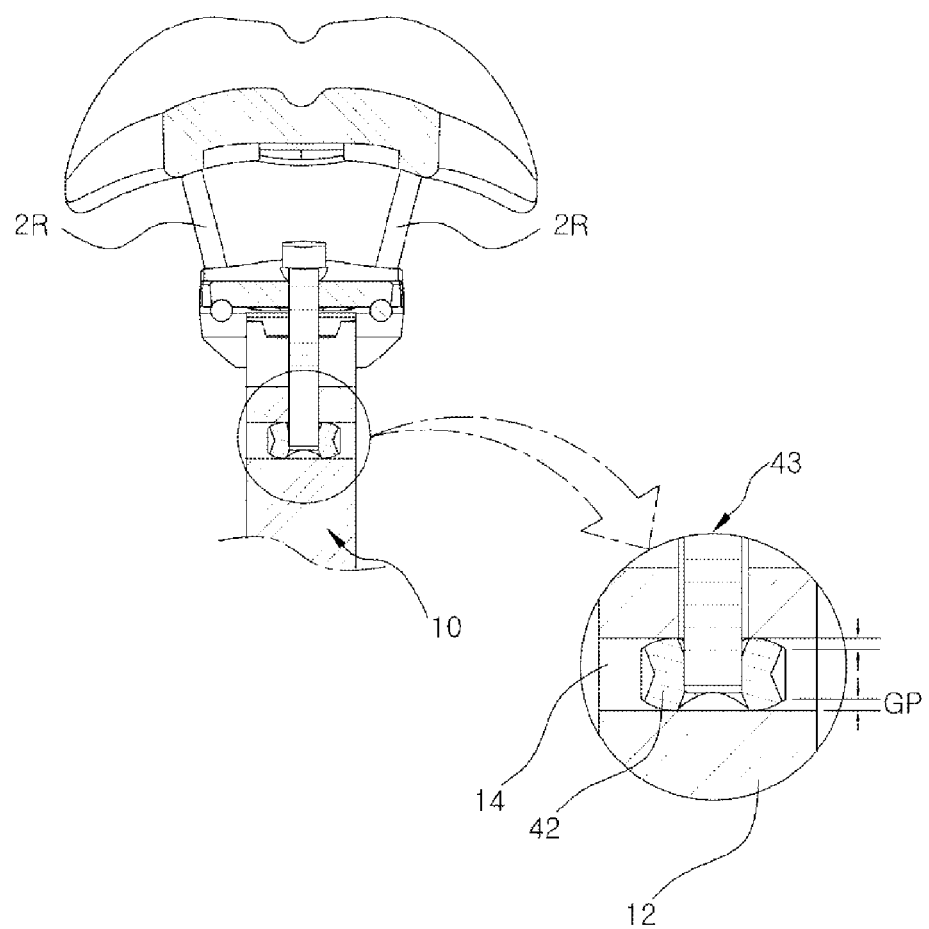
FIG. 7 is a longitudinal sectional view illustrating the coupling structure of a front bolt, a front nut, and a post as major parts of the present invention.
Figure 8:
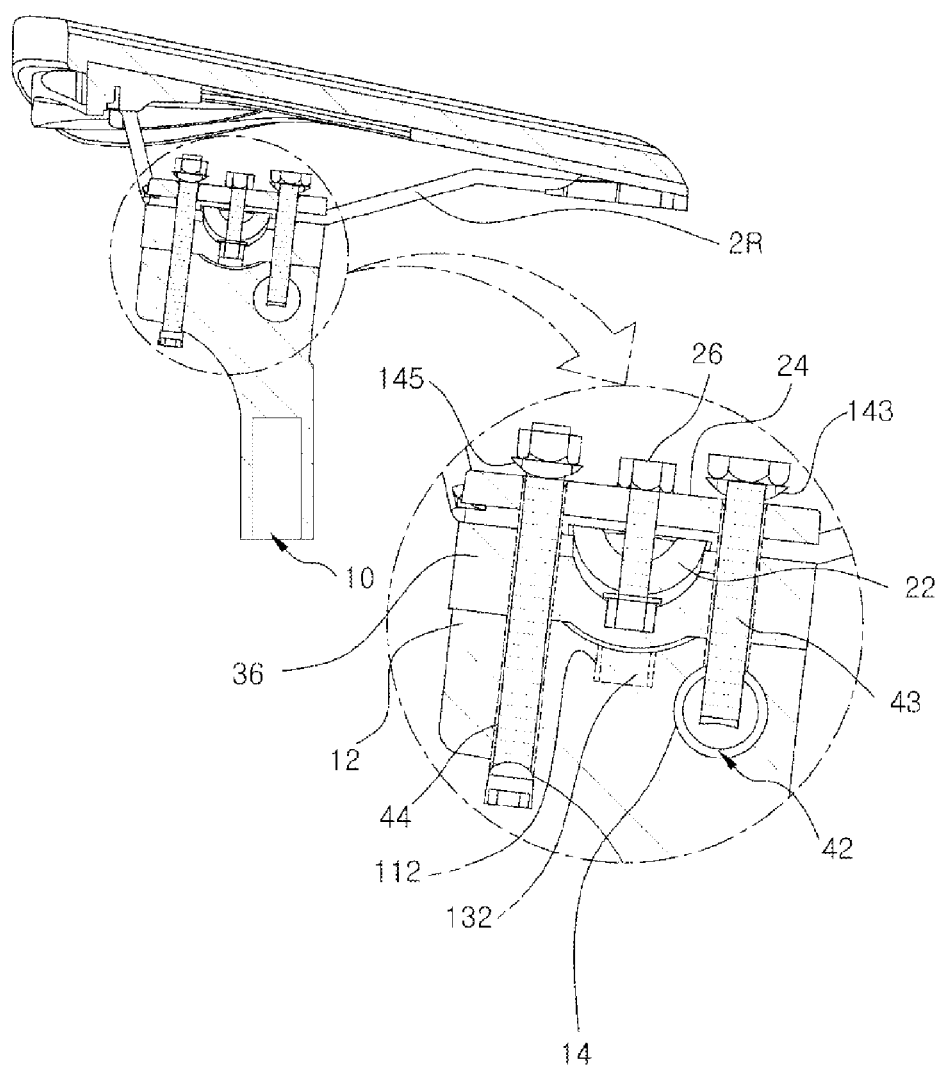
FIG. 8 is a cross-sectional view of FIG. 5 as viewed from one side.
Figure 9:
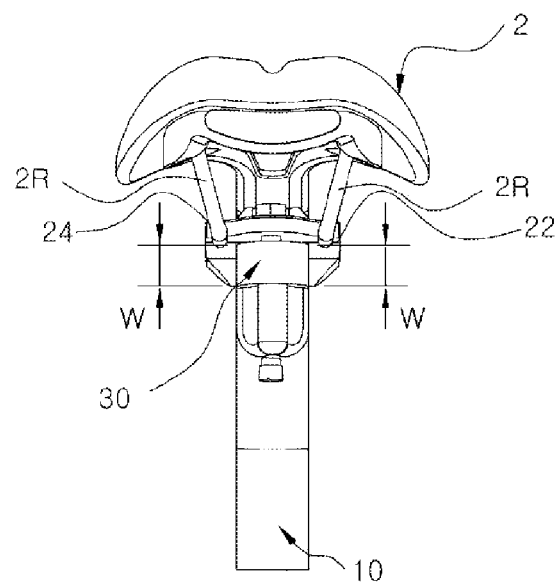
FIGS. 9 to 11 are rear views illustrating the state in which the left and right sides of the seat tilt upward and downward by the variable damper seat post of the present invention.
Figure 10:
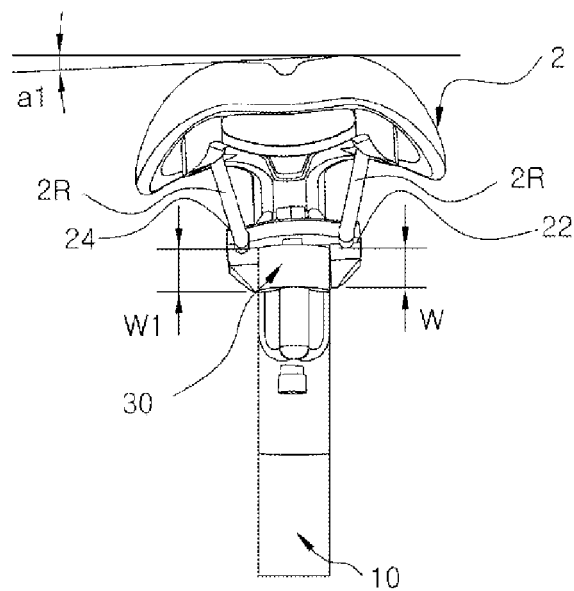
Figure 11:
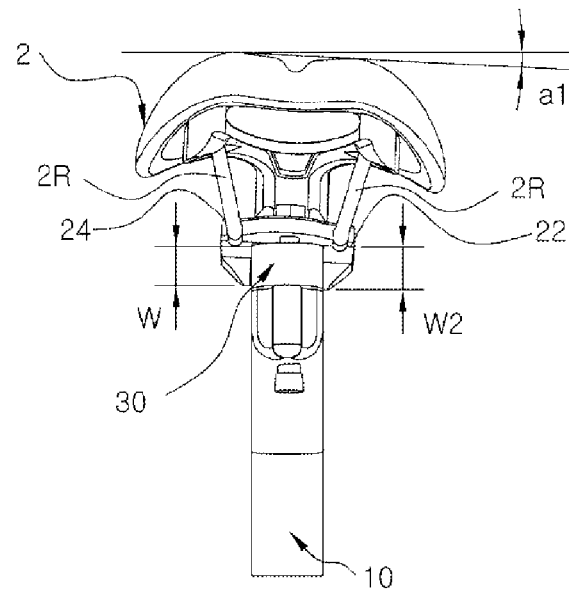
Figure 12:
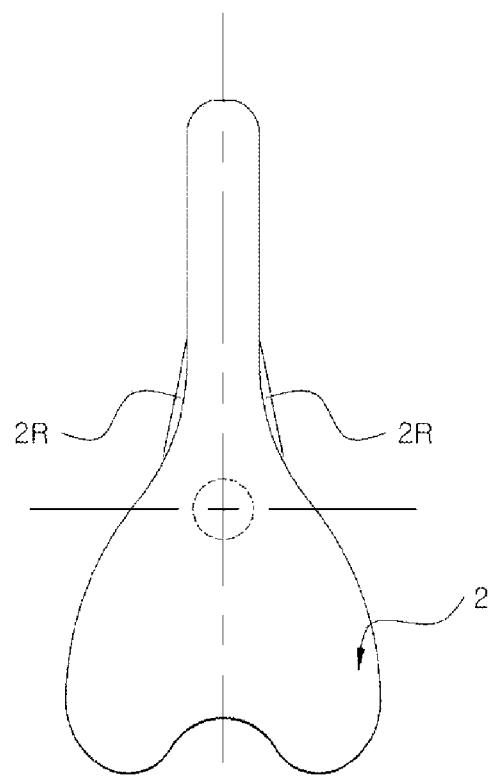
FIGS. 12 to 14 are plan views illustrating the state in which the seat pivots leftward and rightward in the horizontal state by the variable damper seat post of the present invention.
Figure 13:
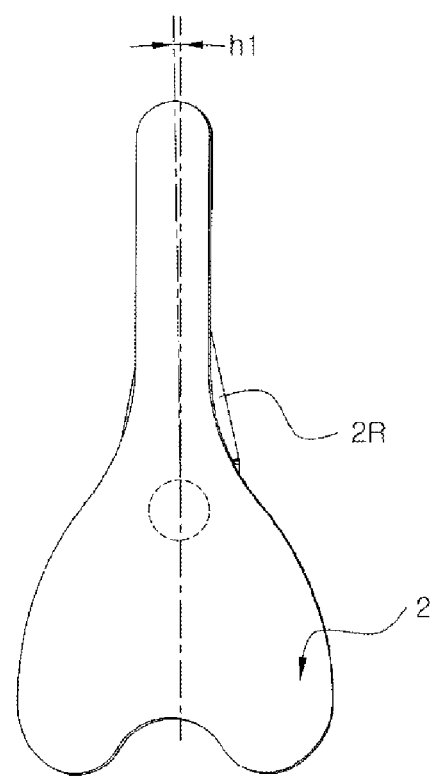
Figure 14:
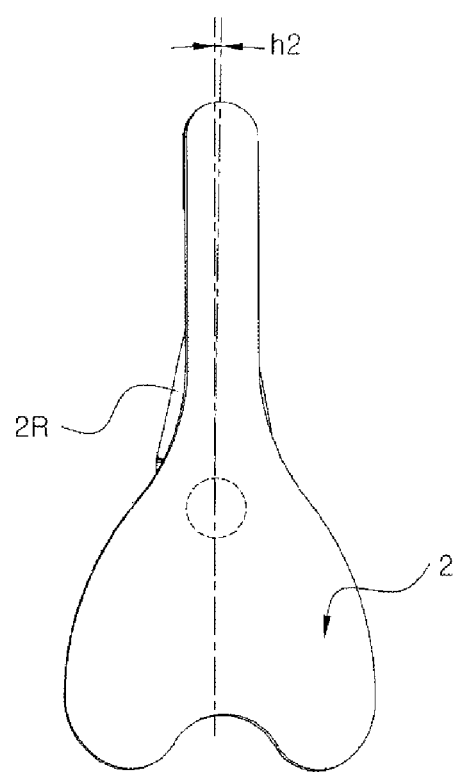
Figure 15:
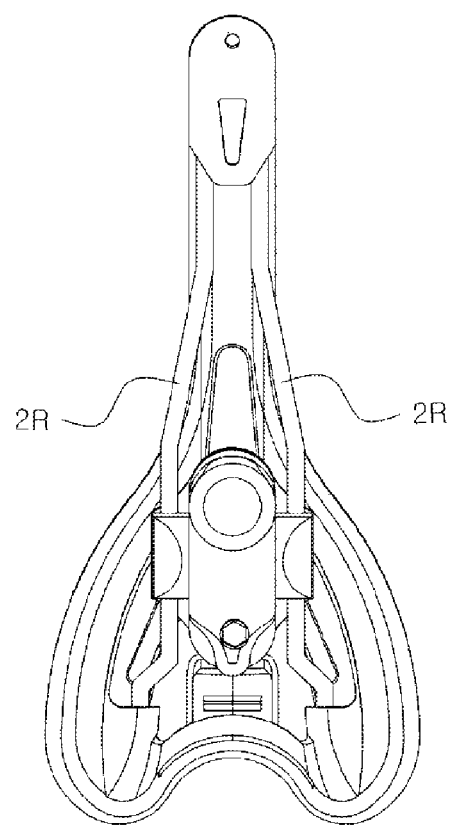
FIG. 15 is a bottom view of FIG. 5.
Figure 16:
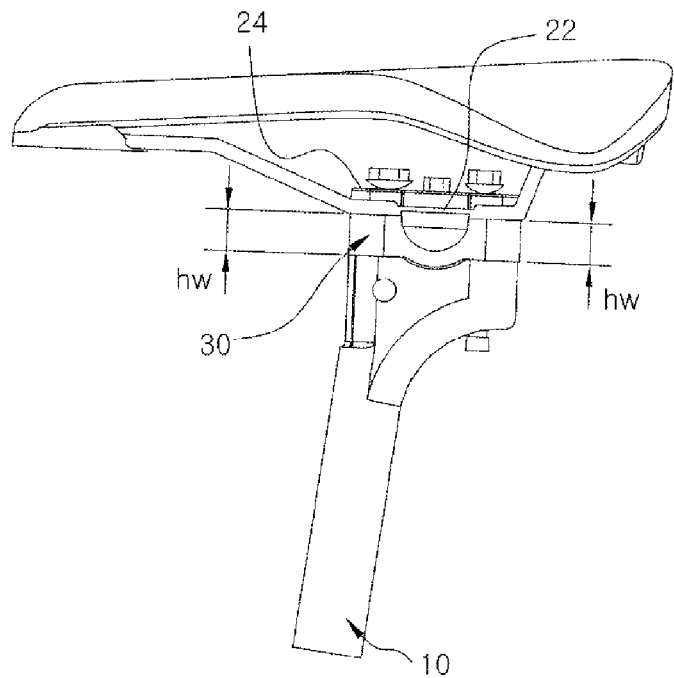
FIGS. 16 to 18 are side views illustrating the state in which the front and rear sides of the seat tilt upward and downward by the variable damper seat post of the present invention.
Figure 17:
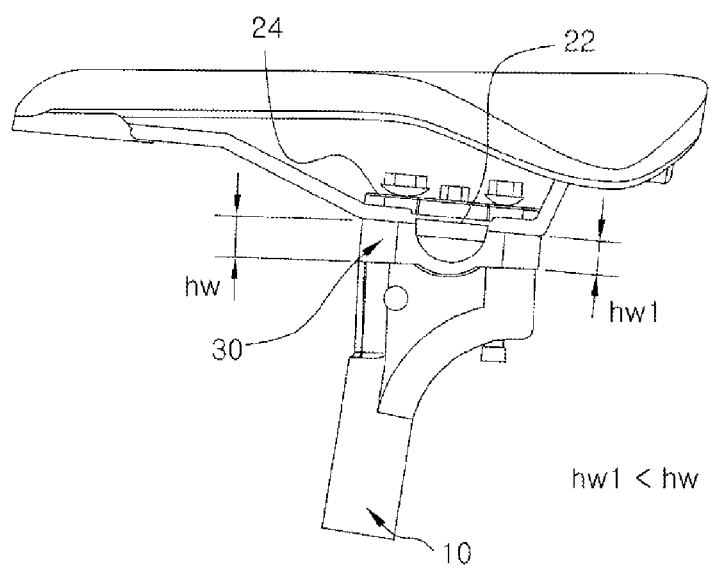
Figure 18:
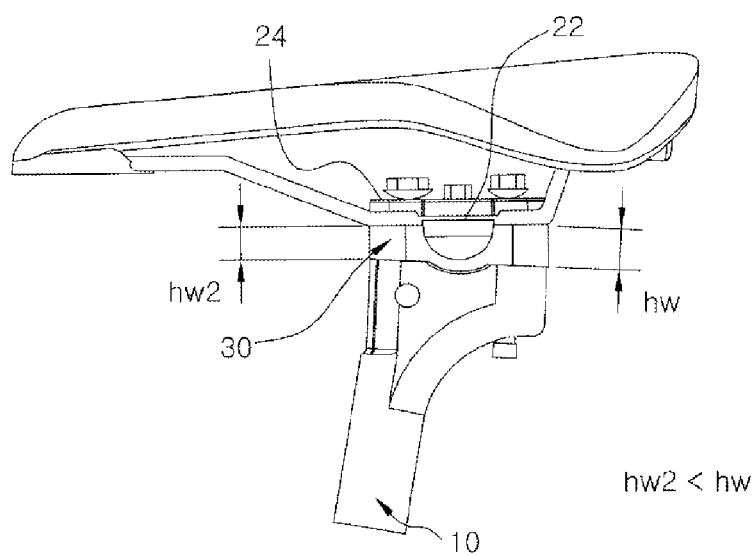
Figure 19:
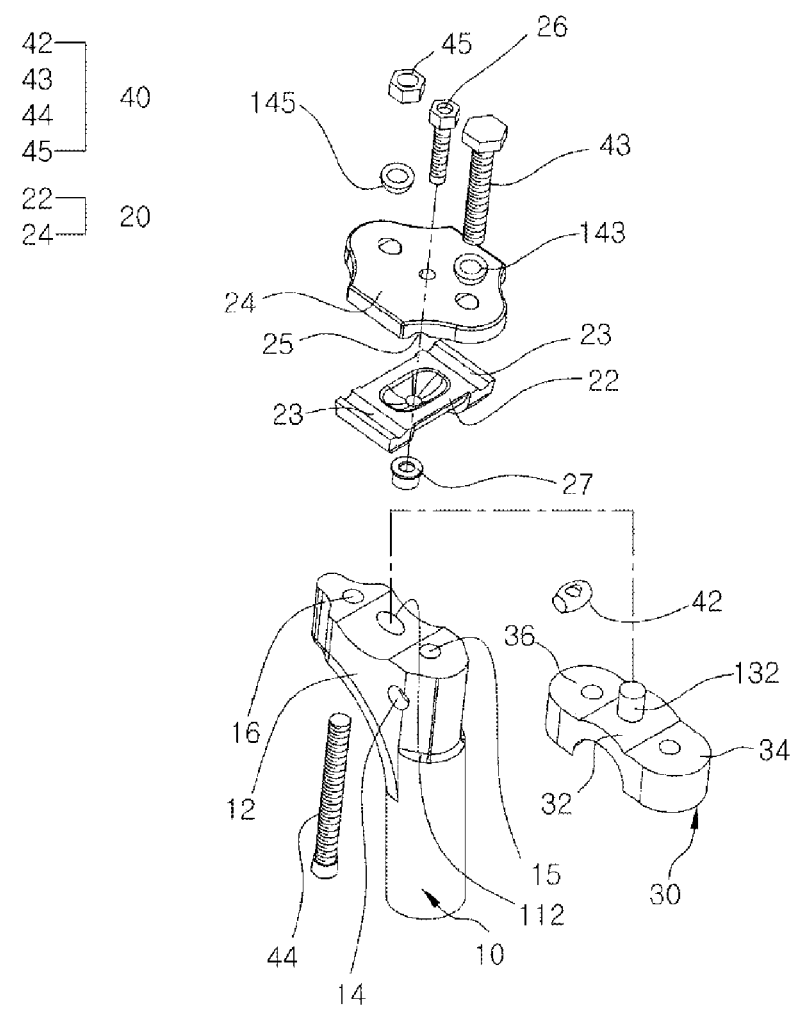
FIG. 19 is an exploded perspective view of major parts of a variable damper seat post according to another embodiment of the present invention.
Figure 20:
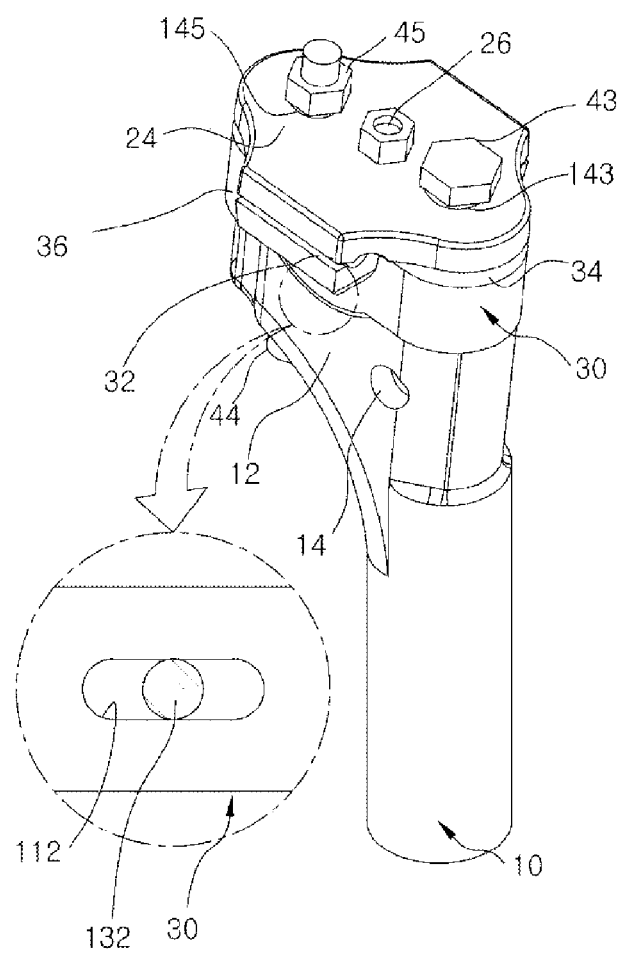
FIG. 20 is a perspective view illustrating the coupled state of the major parts illustrated in FIG. 19.
Figure 21:
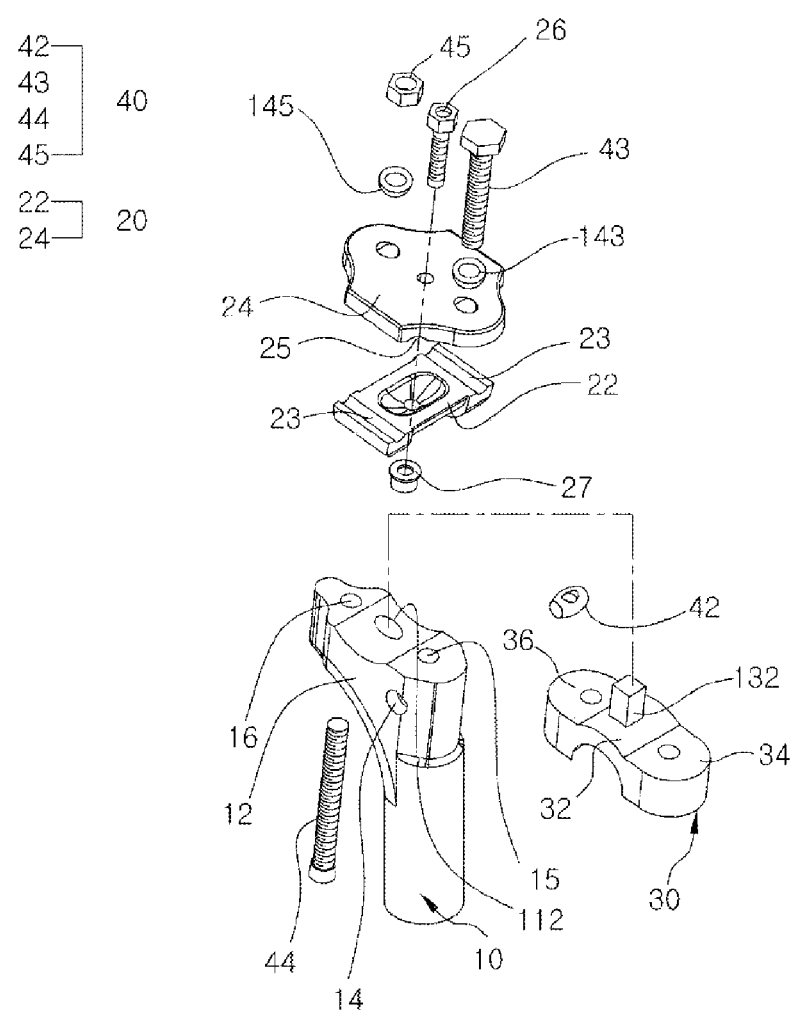
FIG. 21 is an exploded perspective view of major parts of a variable damper seat post according to a further embodiment of the present invention.
Figure 22:
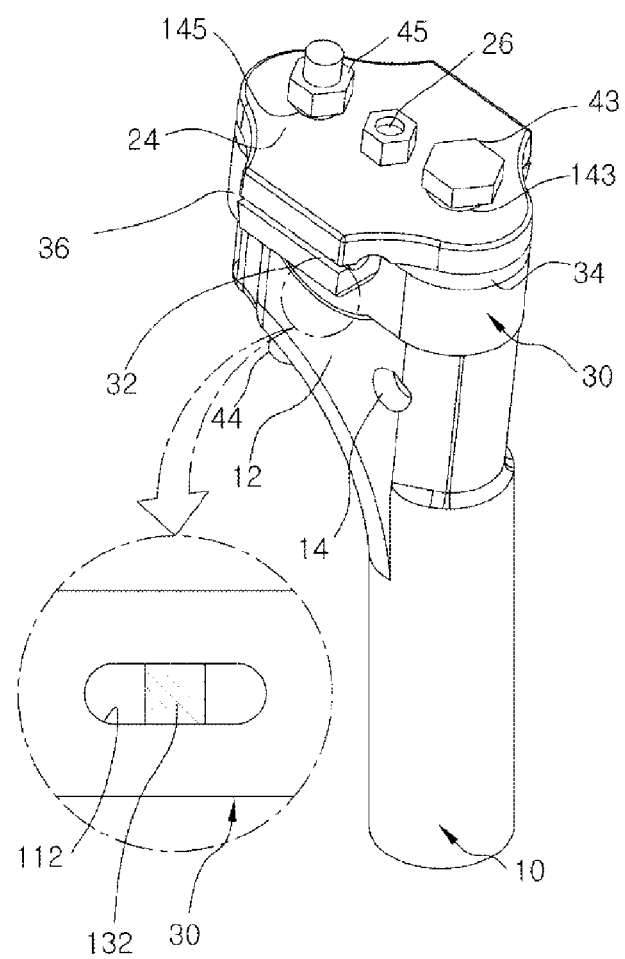
FIG. 22 is a perspective view illustrating the coupled state of the major parts illustrated in FIG. 21.
Figure 23:
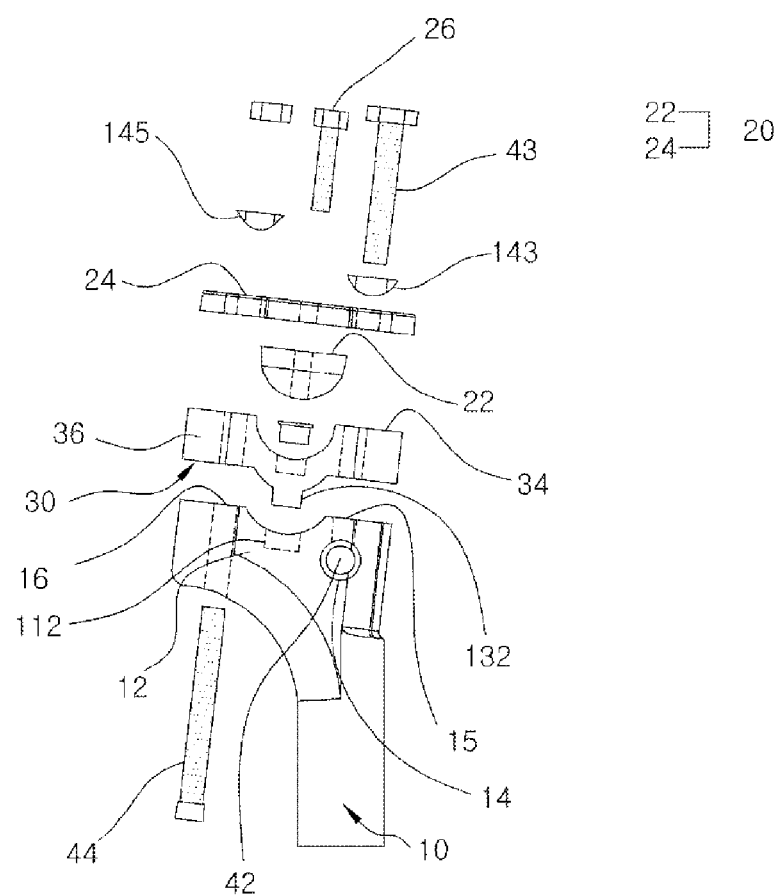
FIG. 23 is a side view illustrating the disassembled state of major parts of the present invention.
Figure 24:
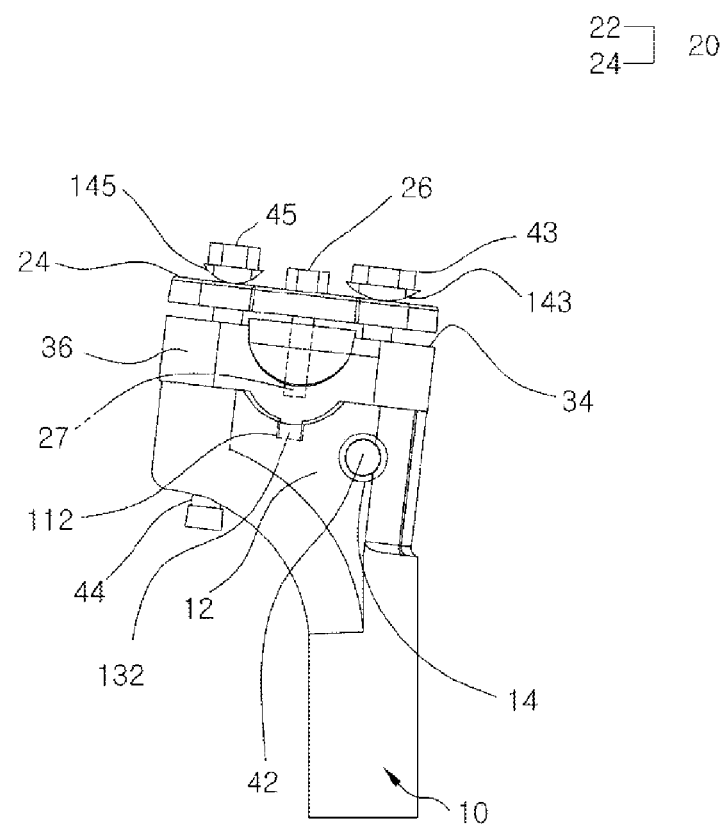
FIG. 24 is a side view illustrating the coupled state of the major parts illustrated in FIG. 23.

In the best mode of the present invention, a variable damper seat post includes a post 10, a seat connecting body 20 coupled to a seat 2 on which buttocks of a cyclist are placed, the seat connecting body being disposed above the post 10, a fixing unit 40 configured to fix the seat connecting body 20 to the post 10, and a damper 30 interposed between the post 10 and the seat connecting body to cause a position of the seat 2 to be varied in response to movement of the buttocks in a state in which the buttocks are placed on the seat 2.

The post 10 includes a damper base 12 forming an upper end thereof, the seat connecting body 20 is disposed above the damper base 12, and the damper 30 is interposed between the damper base 12 and the seat connecting body 20 so that the seat connecting body 20 and the damper 30 are fixed to the damper base 12 by the fixing unit 40.

The fixing unit 40 includes a front nut 42 mounted in a front nut groove formed in the damper base 12, a front bolt 43 penetrating the seat connecting body 20 and the damper 30 and fastened to the nut, a rear bolt 44 coupled to a rear bolt hole in the damper base 12, and a rear nut 45 fastened to the rear bolt 44.

The seat connecting body 20 includes an upper seat connection piece 24 and a lower seat connection piece 22, and a seat rail 2R provided on the lower surface of the seat 2 is interposed between the upper seat connection piece 24 and the lower seat connection piece 22. Each of the lower seat connection piece 22 and the upper seat connection piece 24 of the seat connecting body 20 is provided in a central portion thereof with a lower hole or an upper hole that extends from an upper surface to a lower surface of the corresponding connection piece, and an intermediate bolt 26 is inserted through the lower hole and the upper hole and an intermediate nut 27 is fastened to the intermediate bolt 26 on a lower surface of the seat connecting body 20 so that the intermediate bolt 26 and the intermediate nut 27 constitute a seat connecting body fixing unit.

MODE FOR INVENTION

Hereinafter, exemplary embodiments of the present invention will be described in detail with reference to the accompanying drawings. The objects, features, and advantages of the present invention will be more readily understood by referring to the accompanying drawings and the following detailed description. The same reference numerals will be used throughout the drawings to refer to the same parts. In addition, in the following description of the present invention, a detailed description of known functions and configurations incorporated herein will be omitted when it may make the subject matter of the present invention rather unclear.

In addition, in the description of elements of the present invention, terms such as "first", "second", "A", "B", "(a)", and "(b)" may be used. These terms are only used to distinguish one element from another element, and thus, are not intended to limit the essence, order, or sequence of the elements. It should be understood that, when any element is described as being "connected to", "coupled to", or "joined to" another element, it may be directly on, connected to, or coupled to the other element or intervening elements may be present.

Referring to the drawings, a variable damper seat post of the present invention includes a damper base 12 provided on an upper end of a post 10 for mainly fixing a bicycle seat 2 (saddle), a seat connecting body 20 coupled to the seat 2, on which the buttocks of a cyclist are placed, the seat connecting body 20 being disposed above the damper base 12 on the upper end of the post 10, a fixing unit 40 configured to fix the seat connecting body to the damper base 12, and a damper 30 interposed between the damper base 12 and the seat connecting body 20 to cause the position of the seat 2 to be varied in response to movement of the buttocks in the state in which the buttocks are disposed on the seat 2. In a method of assembling the variable damper seat post (hereinafter also referred to as a saddle pillar for the variable damper 30) of the present invention, after the variable damper 30 is located on an upper portion of the post 10 as a saddle pillar stand in an upright state, a fixing device lower frame for a saddle rail 2R is located on the variable damper 30, the saddle rail 2R is located on the fixing device lower frame, and then, a fixing device upper frame for the saddle rail 2R covers the saddle rail 2R thereunder. In this state, a fixing bolt sequentially passes through a center hole in a hemispherical fixing bolt washer, an upper hole in the upper portion of the saddle pillar stand, and a hole in the fixing device upper frame for the saddle rail 2R. Thereafter, when a fixing nut is located on the fixing bolt and the fixing bolt is engaged with the fixing nut, assembly of the variable damper seat post is completed. The variable damper seat post is used in such a state. The saddle pillar stand is the post 10, the upper portion of the saddle pillar stand is the damper base 12, the fixing device lower frame for the saddle rail 2R is a lower seat connection piece 22, the fixing device upper frame for the saddle rail 2R is an upper seat connection piece 24, the saddle rail 2R is the rail 2R provided beneath the seat 2, the fixing bolt includes a front bolt 43 and a rear bolt 44, the fixing nut includes a front nut 42 and a rear nut 45, and the hemispherical washer includes a front washer 143 and a rear washer 145.

A lower portion of the damper base 12 is connected to the post 10. The lower portion of the damper base 12 may be integrally formed with the post 10. That is, the damper base 12 defines the upper structure of the post 10. The damper base 12 is provided in the upper surface thereof with a damper accommodating recess that is concave downward. The damper accommodating recess is configured as a cylindrical recess that is concave downward when viewed from the lateral side of the damper base 12. In addition, the damper base 12 has a front nut hole 14 formed in a front portion thereof to communicate with opposite sides. The front nut hole 14 penetrates the damper base 12 in a direction perpendicular to the longitudinal direction thereof. In addition, the damper base 12 has a lower front bolt hole 15 formed in a front portion thereof to extend from the front nut hole 14 to the upper surface of the damper base 12. In addition, the damper base 12 has a lower rear bolt hole 16 formed in a rear portion thereof. The lower rear bolt hole 16 communicates with the upper and lower surfaces of the damper base 12.

The seat connecting body 20 is coupled to the lower surface of the seat 2. The post 10 for the seat 2 according to the present invention serves to support a bicycle saddle, and the seat connecting body 20 is coupled to the lower surface of the bicycle saddle. It is to be understood that the bicycle saddle is a kind of the seat 2 and that the seat 2 and the bicycle saddle are of the same concept in the present invention for convenience.

Two saddle rails 2R are provided on the left and right sides of the lower surface of the bicycle saddle, and the seat connecting body 20 is coupled to the two left and right saddle rails 2R. The seat connecting body 20 includes the lower seat connection piece 22 and the upper seat connection piece 24.

The lower seat connection piece 22 is disposed under the saddle rails 2R, which protrude from the lower surface of the bicycle saddle. The lower surface of the lower seat connection piece 22 is configured as a cylindrical surface. That is, the lower seat connection piece 22 is configured as a cylindrical block having a downwardly convex cross-sectional shape as viewed from the lateral side. In addition, a pair of left and right lower rail seating grooves 23 is formed in the upper surface of the lower seat connection piece 22.

The upper seat connection piece 24 is disposed on the saddle rails 2R of the bicycle saddle. The upper seat connection piece 24 is disposed so as to face the lower seat connection piece 22. In addition, the upper seat connection piece 24 has a front extension which protrudes forward and a rear extension which protrudes rearward. The upper seat connection piece 24 has an upper front bolt hole and an upper rear bolt hole, which communicate with the upper and lower surfaces thereof. The upper front bolt hole is formed in the front extension so as to communicate with the upper and lower surfaces thereof, and the upper rear bolt hole is formed in the rear extension so as to communicate with the upper and lower surfaces thereof. A pair of left and right upper rail seating grooves 25 is formed in the lower surface of the upper seat connection piece 24. The upper rail seating grooves 25 in the upper seat connection piece 24 are brought into contact with the lower rail seating grooves 23 in the lower seat connection piece 22 from above.

A pair of the saddle rails 2R on the lower surface of the bicycle saddle is seated in the pair of left and right lower rail seating grooves 23 in the lower seat connection piece 22 and the pair of left and right upper rail seating grooves 25 in the upper seat connection piece 24. In the state in which the lower seat connection piece is disposed under the saddle rails 2R and the upper seat connection piece 24 is disposed above the saddle rails 2R, the pair of saddle rails 2R on the lower surface of the bicycle saddle are coupled by being fitted into the pair of left and right lower rail seating grooves 23 in the lower seat connection piece 22 and the pair of left and right upper rail seating grooves 25 in the upper seat connection piece 24.

The damper 30 and the seat connecting body 20 are fixed to the damper base 12 by the fixing unit 40 in the state in which the damper 30 is interposed between the damper base 12 and the seat connecting body 20 including the lower seat connection piece 22 and the upper seat connection piece 24.

The damper 30 is configured with an elastic member, which is pressed when pressing force is applied thereto and returns to the original shape thereof when the pressing force is released. In the present invention, the damper 30 may be formed of rubber. The damper 30 takes the form of a block having an intermediate damper portion 32 between the front end and the rear end thereof. The intermediate damper portion 32 of the damper 30 protrudes downward. The lower surface of the intermediate damper portion 32 is configured as a cylindrical surface when viewed from the lateral side of the damper 30. In addition, the upper surface of the intermediate damper portion 32 is also configured as a cylindrical surface that is concave downward when viewed from the lateral side of the damper 30. Thus, the intermediate damper portion 32 takes the form of a cylindrical block that is convex downward when viewed from the lateral side of the damper 30. The intermediate damper portion 32 may be provided in the upper surface thereof with a cylindrical accommodating recess for the seat connecting body 20. The cylindrical surface which is the lower surface of the intermediate damper portion 32 is seated in the cylindrical damper accommodating recess that is concave downward in the damper base 12. The damper 30 is configured such that a front damper portion 34 and a rear damper portion 36 are provided respectively at the front and rear sides of the intermediate damper portion 32.

In addition, the damper 30 has a front bolt hole and a rear bolt hole in front and rear portions thereof. The front bolt hole and the rear bolt hole communicate with the upper and lower surfaces of the damper 30. The front bolt hole in the damper 30 is aligned with the upper front bolt hole in the upper seat connection piece 24 so as to be connected thereto from below, and the rear bolt hole in the damper 30 is aligned with the upper rear bolt hole in the upper seat connection piece 24 so as to be connected thereto from below.

The damper 30 is interposed between the damper base and the seat connecting body 20. The intermediate damper portion 32 of the damper 30 is seated in the damper accommodating recess in the damper base 12, which forms an upper end portion of the post 10, and the front damper portion 34 and the rear damper portion 36 on the front and rear sides of the damper 30 are placed on a front support portion and a rear support portion for the damper 30, which are provided at the front and rear sides of the damper accommodating recess in the damper base 12. In addition, the lower seat connection piece 22, which constitutes the seat connecting body 20, is seated in the accommodating recess for the seat connecting body 20 formed in the upper surface of the damper 30. The damper base 12, the damper 30, the seat connecting body 20, and the seat 2 (bicycle saddle) are stacked in this order from below.

The seat connecting body 20 and the damper 30 are connected to the damper base 12 on the upper end of the post 10 by the fixing unit 40. The fixing unit 40 includes the front nut 42, the front bolt 43, the rear bolt 44, and the rear nut 45.

The front nut 42 takes the form of a drum, the diameter of which gradually decreases from a central portion toward opposite sides. When viewing the front nut from the front, the front nut 42 is configured such that the outer diameter thereof gradually decreases toward opposite sides from the center line between both the ends of the front nut 42. It can be said that the front nut 42 has a jar shape when viewed from the front. The front nut 42 has therein a front bolt coupling hole having an open upper side. The front bolt coupling hole is a screw hole having a thread on the inner peripheral surface thereof. A front nut groove formed in the front portion of the damper base 12 is configured as an elongated groove that extends in a direction perpendicular to the longitudinal direction of the damper 30. That is, the front nut groove is oriented in a direction perpendicular to the longitudinal direction from the front end to the rear end of the damper base 12. The front nut 42 is mounted in the front nut groove in the damper base 12. The front nut 42 is mounted in the front nut groove in the damper base 12 so as to be oriented in a direction perpendicular to the longitudinal direction of the damper base 12. At this time, the front bolt coupling hole in the front nut 42 comes into contact with the front bolt hole formed in the damper 30. In addition, when the front nut 42 is mounted in the front nut groove in the damper base 12, a gap having a predetermined width is formed between the outer peripheral surface of the front nut 42 and the inner peripheral surface of the front nut groove. Since the front nut 42 takes the form of a jar, the outer diameter of which gradually decreases from the central portion toward opposite sides, the gap having a predetermined width is formed between the outer peripheral surface of the front nut 42 and the inner peripheral surface of the front nut groove in the damper base 12.

The front bolt 43 passes through the upper front bolt hole formed in the upper seat connection piece 24 of the seat connecting body 20, the front bolt hole formed in the damper 30, and the lower front bolt hole 15 in the damper base 12 and is fastened to the front bolt coupling hole in the front nut 42.

At this time, the front washer 143 is interposed between a head portion of the front bolt 43 and the upper surface of the seat connecting body 20. The front washer 143 is interposed between the upper surface of the upper seat connection piece 24, which constitutes the seat connecting body 20, and the head portion of the front bolt 43. In addition, the front washer 143 has a dome-shaped lower surface, which is in contact with the upper surface of the seat connecting body 20. A dome-shaped front washer seating recess that is concave downward may be formed in the upper surface of the upper seat connection piece 24 so that the dome-shaped lower surface of the front washer 143 is brought into contact with the front washer seating recess.

The rear bolt 44 is fastened to pass through the upper rear bolt hole formed in the upper seat connection piece 24 of the seat connecting body 20, the rear bolt hole formed in the damper 30, and the lower rear bolt hole 16 in the damper base 12. A head portion of the rear bolt 44 is caught by the peripheral wall of the lower rear bolt hole 16 at the lower side of the damper base 12, and the rear bolt 44 protrudes upward from the upper rear bolt hole in the upper seat connection piece 24.

The rear nut 45 is engaged with the rear bolt 44 at the upper side of the upper seat connection piece 24. The seat connecting body 20, which includes the upper seat connection piece 24 and the lower seat connection piece 22, is connected to the damper 30 and the damper base 12 by the front nut 42, the front bolt 43, the rear bolt 44, and the rear nut 45 in the state in which the rails 2R provided on the lower surface of the seat 2 (the bicycle saddle) are interposed between the upper seat connection piece 24 and the lower seat connection piece 22, and the seat 2 is connected to the damper base 12 of the post 10 by means of the seat connecting body 20 connected as described above.

At this time, the rear washer 145 is interposed between the rear nut 45 and the upper surface of the seat connecting body 20. The rear washer 145 is interposed between the upper surface of the upper seat connection piece 24, which constitutes the seat connecting body 20, and the rear nut 45. In addition, the rear washer 145 has a dome-shaped lower surface, which is in contact with the upper surface of the seat connecting body 20. A dome-shaped seating recess for the rear washer 145 which is concave downward is formed in the upper surface of the upper seat connection piece 24 so that the dome-shaped lower surface of the rear washer 145 is brought into contact with the seating recess for the rear washer 145.

Alternatively, the head portion of the rear bolt 44 may be disposed on the upper surface of the upper seat connection piece 24 and the rear nut 45 may be fastened to the rear bolt 44 so as to be caught by the rear bolt hole peripheral wall of the damper base 12, so that the rear washer 145 is interposed between the head portion of the rear bolt 44 and the upper surface of the upper seat connection piece 24. That is, the head portion of the rear bolt 44 may be disposed on the upper surface of the seat connecting body 20, the rear washer 145 may be interposed between the head portion of the rear bolt 44 and the upper surface of the seat connecting body 20, and the rear washer 145 may have the dome-shaped lower surface, which is in contact with the upper surface of the seat connecting body 20, so that the rear nut 45 is fastened to the rear bolt 44 on the rear lower surface of the damper base 12.

As described above, the damper 30, the seat connecting body 20, and the bicycle saddle are fixed to the damper base 12 of the post 10 by the engagement of the front bolt 43, the front nut 42, the rear bolt 44, and the rear nut 45. Needless to say, the front washer 143 is interposed between the head portion of the front bolt 43 and the upper surface of the upper seat connection piece 24, and the rear washer 145 is interposed between the rear nut 45 and the upper surface of the upper seat connection piece 24.

Meanwhile, the lower seat connection piece 22 and the upper seat connection piece 24 are respectively provided in the central portion thereof with a lower hole and an upper hole, which communicate with the upper and lower surfaces thereof, and an intermediate bolt 26 is inserted into the lower hole and the upper hole. An intermediate nut 27 is fastened to the intermediate bolt 26 on the lower surface of the lower seat connection piece 22. In the present invention, it can be said that the intermediate bolt 26 and the intermediate nut 27 constitute a seat connecting body fixing unit 20a.

Thus, in the state in which the rails 2R of the seat 2 are fitted into the lower rail seating grooves 23 in the lower seat connection piece 22 and the upper rail seating grooves 25 in the upper seat connection piece 24, when the intermediate bolt 26 is fastened to the lower hole and the upper hole and the intermediate nut 27 is fastened to the intermediate bolt 26 at the lower side of the lower seat connection piece 22, the seat connecting body 20 including the lower seat connection piece 22 and the upper seat connection piece 24 may be fixed to the rails 2R of the seat 2. Therefore, an operation of connecting and assembling the damper 30 and the seat connecting body 20 to and with the damper base 12 of the post 10 by the fixing unit 40 may be easily performed.

In addition, since the intermediate nut 27 is inserted into an intermediate nut groove 38 formed in substantially the middle of the upper surface of the damper 30, the coupling structure between the damper 30 and the seat connecting body 20 may be rigid and an operation of assembling the damper 30 and the seat connecting body 20 with each other may be easily performed.

The variable damper seat post of the present invention having the above-described configuration is mainly used to couple a bicycle saddle to the post 10 of a bicycle. Hereinafter, an operation of the variable damper seat post of the present invention when a person (hereinafter referred to as a cyclist) rides a bicycle with their buttocks on the bicycle saddle will be described.

The cyclist rides a bicycle by repeating the action of alternately stepping on bicycle pedals with their left and right feet (hereinafter referred to as "pedaling") in the state in which the buttocks of the cyclist are placed on a bicycle saddle (hereinafter referred to as a saddle for convenience of explanation). During repetitive pedaling, rear muscles of the thighs and the buttocks move leftward and rightward on the saddle.

When the cyclist steps on the pedal with the left foot (hereinafter referred to as "left pedaling"), the left buttock and rear muscles of the left thigh move leftward and downward. In the present invention, since the seat connecting body 20 and the damper 30 are interposed between the bicycle post 10 and the saddle, when the left buttock and rear muscles of the left thigh move leftward and downward via left pedaling by the cyclist, the left side of the damper 30 is pressed downward, thus causing the left side of the saddle to move downward while being in contact with the left buttock and rear muscles of the left thigh. At the same time, the front side of the saddle horizontally pivots leftward during left pedaling. Since a gap having a predetermined width is provided between the outer peripheral surface of the front nut 42 having a jar shape and the front nut groove 14 in the damper base 12, the left end of the front nut 42 horizontally pivots rearward of the damper base 12 when the left side of the saddle moves downward during left pedaling, whereby the front side of the saddle may horizontally pivot leftward. Thus, when the cyclist performs left pedaling, the left buttock and rear muscles of the left thigh are prevented from successively colliding against the saddle. Particularly, since the front nut 42 has a jar shape and the saddle is horizontally pivotable leftward during left pedaling, the left buttock and rear muscles of the left thigh are reliably prevented from successively colliding against the saddle when the cyclist performs left pedaling.

In addition, when the cyclist steps on the pedal with the right foot (hereinafter referred to as "right pedaling"), the right buttock and rear muscles of the right thigh move rightward and downward. In the present invention, since the seat connecting body 20 and the damper 30 are interposed between the bicycle post 10 and the saddle, when the right buttock and rear muscles of the right thigh move rightward and downward via right pedaling by the cyclist, the right side of the damper 30 is pressed downward, thus causing the right side of the saddle to move downward while being in contact with the right buttock and rear muscles of the right thigh. At the same time, the front side of the saddle horizontally pivots rightward during right pedaling. Since a gap having a predetermined width is provided between the outer peripheral surface of the front nut 42 having a jar shape and the front nut groove 14 in the damper base 12, the right end of the front nut 42 horizontally pivots rearward of the damper base 12 when the right side of the saddle moves downward during right pedaling, whereby the front side of the saddle may horizontally pivot rightward. Thus, when the cyclist performs right pedaling, the right buttock and rear muscles of the right thigh are prevented from successively colliding against the saddle.

Accordingly, with the variable damper seat post of the present invention, when the left buttock and the right buttock continuously move leftward and rightward and rear muscles of the left thigh and rear muscles of the right thigh continuously move while the cyclist who sits on the bicycle saddle continuously steps on the pedals, the damper 30 causes the bicycle saddle to move while being in contact with the left buttock and rear muscles of the left thigh and the right buttock and rear muscles of the right thigh in response to the movement described above, whereby the body region mentioned above is prevented from successively colliding against the bicycle saddle during pedaling. By preventing the body region which moves during pedaling from colliding against the bicycle saddle, the cyclist is prevented from feeling pain. That is, since the left and right buttocks and rear muscles of the left thigh and the right thigh are prevented from successively colliding against the bicycle saddle during pedaling, the left and right buttocks and rear muscles of the left thigh and the right thigh are prevented from feeling pain. In the past, since the bicycle saddle is fixed, the left buttock and rear muscles of the left thigh successively collide against the saddle during left pedaling, which causes pain in the left buttock and rear muscles of the left thigh, for example. On the other hand, the present invention prevents such a pain causing phenomenon.

In the present invention, when the cyclist steps on the pedals, left-and-right seesaw movement in which the left and right sides of the saddle alternately move upward and downward and left-and-right horizontal movement in which the front side of the saddle horizontally pivots leftward and rightward are realized in response to movement of the buttocks, it is possible to prevent pain caused when the buttocks and the body region therearound successively collide against the saddle during pedaling.

In addition, in the present invention, since the front washer 143 interposed between the head portion of the front bolt 43 and the upper surface of the seat connecting body 20 has the dome-shaped lower surface and the rear washer 145 interposed between the rear nut 45 fastened to the rear bolt 44 and the upper surface of the seat connecting body 20 also has the dome-shaped lower surface, when the buttocks and muscles therearound move forward and rearward during pedaling by the cyclist, the lower surface of the front washer 143 and the lower surface of the rear washer 145 are seesawed forward and rearward on the seat connecting body 20, whereby the bicycle saddle also pivots forward and rearward in a seesaw manner about the seat connecting body 20. When the saddle pivots forward and rearward in a seesaw manner, the front damper portion 34 and the rear damper portion 36 of the damper 30 are expanded and contracted to perform a shock-absorbing function, and the bicycle saddle moves forward and rearward together with the buttocks and muscles therearound while being in contact with the buttocks and muscles therearound. Therefore, the bicycle saddle is prevented from colliding against muscles around the buttocks of the cyclist, and the buttocks and muscles therearound are prevented from feeling pain due to collision against the bicycle saddle.

As described above, since the front nut 42 is formed in a jar shape to enable the saddle to horizontally pivot rightward during right pedaling, and since the lower surfaces of the front washer 143 and the rear washer 145 are formed in a dome shape to enable the saddle to pivot forward and rearward in a seesaw manner about the post 10 in response to movement of the buttocks and muscles therearound without being separated from the buttocks and muscles therearound, when the cyclist continues left pedaling and right pedaling, it is possible to reliably prevent the left and right buttocks and rear muscles of the left and right thighs from successively colliding against the saddle, and consequently, the cyclist is reliably prevented from feeling pain in the buttocks and muscles therearound. As a result, in the present invention, by enabling the saddle to move in a total of six directions via left-and-right seesaw-type pivoting, left-and-right horizontal pivoting, and front-and-rear seesaw-type pivoting, it is meaningful to be able to completely prevent pain caused when the buttocks and muscles therearound of the cyclist collide against the bicycle saddle.

Meanwhile, in the present invention, the damper base 12 may be provided with a support block recess 112 and a support block 132 may be provided on the lower surface of the damper 30 so that the support block 132 is coupled to the support block recess 112 in the damper base 12. The support block recess 112 may be deeper than the damper accommodating recess in the damper base 12, and the support block 132 may protrude downward from the intermediate damper portion 32 of the damper 30, so that the support block 132 of the damper 30 may be coupled to the support block recess 112 in the damper base 12.

Since the support block 132 is fitted into the support block recess 112 so that the damper 30 is coupled to the damper base 12, the damper 30 and the saddle are prevented from deviating laterally from each other during pedaling, whereby it is possible to prevent the saddle from colliding against the buttocks of the cyclist and muscles therearound.

Assuming that the damper 30 is coupled to the damper base 12 without the support block 132, the damper 30 may slide laterally from the damper base 12 during pedaling by the cyclist, and consequently, the damper 30 and the saddle may deviate from a mounting track thereof. When the saddle and the damper 30 deviate from the track, the saddle may not move in response to movement of the buttocks during pedaling, and therefore, there is a possibility of the saddle colliding against the buttocks of the cyclist who steps on the pedals. In such a case, the effect of preventing the buttocks from colliding against the bicycle saddle during pedaling to prevent generation of pain may be somewhat reduced.

On the other hand, in the present invention, since the support block 132 protruding downward from the damper 30 is fitted into the support block recess 112 formed in the damper base 12 of the post 10, the damper 30 and the saddle do not slide laterally from the damper base 12 and do not deviate from the mounting track thereof. Therefore, the saddle may move in response to movement of the buttocks during pedaling as described above, whereby it is possible to prevent the saddle from colliding against the buttocks of the cyclist who steps on the pedals.

In addition, the support block 132 of the damper 30 may be configured as a block having a rectangular cross-sectional shape so that at least opposite surfaces of the support block 132 come into close contact with opposite inner surfaces of the support block recess 112.

In this case, compared to the case in which the support block 132 has a circular cross-sectional shape, opposite surfaces of the support block 132 are more reliably prevented from successively colliding against opposite inner surfaces of the support block recess 112 in the damper base 12 during pedaling. By preventing successive collisions between the support block 132 of the damper 30 and the support block recess 112 in the damper base 12, it is possible to prevent the support block 132 of the damper 30 from being easily worn or broken. This may ensure the robust coupling structure between the damper 30 and the damper base 12 and an extended lifespan thereof.

The variable damper seat post of the present invention may be employed in the structure of the post 10 that supports various types of seats 2 but is primarily employed in the bicycle saddle (seat 2). According to the present invention, when the cyclist continuously steps on the pedals with the buttocks on the bicycle saddle, the saddle moves smoothly in response to movement of the buttocks and muscles therearound caused by pedaling, whereby it is possible to prevent pain and injury caused when the buttocks and muscles therearound continuously collide against the saddle, to achieve an increase in cycling speed owing to smooth pedaling, and to assist posture correction at the time of pedaling.

Meanwhile, the damper base 12 has the damper accommodating recess that is concave downward when viewed from the lateral side and the intermediate damper portion which has a semicircular shape when viewed from the lateral side is provided on the lower surface of the damper 30 so that the intermediate damper portion 32 of the damper 30 is coupled to the damper accommodating recess in the damper base 12.

Accordingly, since the damper 30 is prevented from being separated forward or rearward from the damper base 12, it is possible to prevent pain (called "saddle pain") caused when the buttocks and muscles therearound (called "ischial tuberosity") of the cyclist collide against the saddle with higher efficiency. Since the intermediate damper portion 32 of the damper 30 is seated in the damper accommodating recess in the damper base 12 while the cyclist steps on the pedals so that the damper 30 is prevented from deviating forward or rearward from the damper base 12, it is possible to prevent deterioration in the efficiency of preventing saddle pain caused when the damper 30 and the saddle connected to the damper 30 deviate forward or rearward from the damper base 12.

In addition, since an assembly operation is performed in the state in which the intermediate damper portion 32 of the damper 30 is seated in the damper accommodating recess in the damper base 12, an operation of assembling the seat connecting body 20 and the damper as major parts of the present invention with the bicycle saddle and the post 10 may be easily and efficiently performed.

In addition, the damper 30 includes the front damper portion 34 and the rear damper portion 36 at opposite sides of the intermediate damper portion 32 so that each of the front damper portion 34 and the rear damper portion supports the weight of the cyclist from below to reliably exert a shock-absorbing function when the saddle performs front-and-rear seesaw movement about the post 10 during pedaling. Thus, this configuration of the damper is effective for preventing saddle pain described above.

The damper 30 is formed of an elastic material such as elastic rubber, and reinforcement yarns are embedded in the damper 30. The seat 2 may be formed by wefts and warps of the reinforcement yarns. When the reinforcement yarns are embedded in the damper 30, the reinforcement yarns increase the strength of the damper 30 to prevent damage to the damper 30 such as tearing. Thereby, it is possible to further improve the rigidity of the variable damper seat post of the present invention and to prolong the lifespan thereof.

Meanwhile, in the present invention, gaps having predetermined widths are defined between the outer peripheral surfaces of the bolts, designated by "43" and "44", and the bolt holes in the lower seat connection piece 22 and the upper seat connection piece 24 of the seat connecting body 20, the damper 30, and the damper base 12 to enable the operation described above.

The effects of the variable damper seat post of the present invention as described above are summarized as follows.

First, since the cyclist steps on the pedals in the state in which the saddle and the ischial tuberosity are continuously in contact with each other, there is no collision between the saddle and the ischial tuberosity, and thus there is no generation of pain. Here, the ischial tuberosity refers to the buttocks and muscles therearound of the cyclist. Since there is no continuous collision between the ischial tuberosity and the saddle, there occurs no generation of pain.

Second, unlike a conventional fixed saddle against which the left and right hip bones alternately collide, and thus which causes friction, resulting in the loss of pedaling force, the saddle pillar for the variable damper enables pedaling without the loss of force due to friction, which results in an increase in cycling speed. In addition, since the bicycle saddle moves together with the ischial tuberosity by the damper 30 in the state in which the ischial tuberosity is continuously in contact with the saddle, the cycling speed (i.e. pedaling speed) may be increased without the loss of pedaling force due to friction.

Third, in the saddle pillar for the variable damper 30, the contraction and relaxation of the variable damper are helpful to increase pedaling force by momentum, thus contributing to an increase in cycling speed. Since the saddle moves smoothly in the same direction as the direction in which the ischial tuberosity moves without collision with the saddle, the pedaling force is increased by momentum, which is helpful to increase cycling speed.

Fourth, damage to pants due to friction is reduced, which is economical. The friction between expensive pants worn by the cyclist and the saddle is reduced, and thus, a possibility of damage to the pants due to friction is reduced, which is economically advantageous.

Fifth, since the variable damper 30 absorbs vibration transmitted from an irregular road surface, it is effective to reduce the occurrence of pain and fatigue. Since the variable damper 30 is formed of rubber, for example, which is capable of absorbing shocks, it is possible to minimize the transmission of vibration to the cyclist even when the bicycle moves along an irregular road surface on which gravel is present, which enables reduction in pain and fatigue accumulation.

Sixth, in the saddle pillar for the variable damper 30, the contraction and relaxation of the variable damper adds fun to the cyclist and increases exercise effects. The cyclist may feel as if they are riding a seesaw by the motion of the saddle while riding the bicycle, which allows the cyclist to enjoy riding the bicycle and increases exercise effects.

Seventh, the saddle pillar for the variable damper 30 adopts a conventional saddle pillar fixing device, and thus is compatible with a general saddle. Since the seat 2 may be separated from the post 10 via the damper 30 and the seat connecting body 20 by releasing the fixing unit that is one major part of the present invention, the saddle pillar may be used in any article that requires the seat 2, which increases the usability of the saddle pillar.

Eighth, compared to a conventional saddle pillar, the variable damper saddle pillar of the present invention more easily moves the center of gravity of the cyclist leftward or rightward during cycling. Thus, moving the center of gravity of the cyclist to one side at the time of cornering is helpful to reduce the radius of rotation and to increase the cycling speed via stabilized posture control.

Ninth, when the cyclist steps on the pedals provided with shoe fixing clips, the lengths from the saddle to the pedals are constant. However, since every person has a slight difference in the length of both legs, continuous pedaling may cause various pain and body imbalance, for example, due to leftward or rightward twisting of the pelvis. The variable damper saddle pillar prevents the leftward or rightward twisting of the pelvis by slightly tilting the left and right sides of the horizontal saddle.

Tenth, conventionally, the cyclist may often experience forward overturn together with a bicycle when applying a front wheel brake during cycling. In the present invention, even if the cyclist applies the front wheel brake during cycling, the saddle moves forward, causing the buttocks of the cyclist to move forward and the center of gravity of the cyclist to be lowered. This prevents forward overturn of a bicycle. At the time when the cyclist applies the front wheel brake during cycling, the front damper portion 34 of the variable damper 30 is pushed downward, thus causing the front side of the saddle to pivot downward, whereby the center of gravity of the cyclist (the center of gravity due to the weight of the cyclist) is lowered compared to the case in which the cyclist does not apply the front wheel brake. Thus, it is possible to prevent the bicycle from overturning forward even if the front wheel brake is caught during cycling as described above. This further increases the safety of the cyclist.

In addition, conventionally, in the case in which the cyclist applies a rear wheel brake while riding the bicycle at a high speed, a rear wheel of the bicycle may fluctuate on the ground (as if a fish tail swings to the left side and to the right side) and the safety thereof is low. On the other hand, in the present invention, when the cyclist applies the rear wheel brake suddenly while riding the bicycle at a high speed, the bicycle saddle tilts forward, causing the buttocks of the cyclist to move forward and the center of gravity of the cyclist to be lowered, which prevents the rear wheel of the bicycle from fluctuating on the ground. At the time when the cyclist applies the rear wheel brake during cycling, the front damper portion 34 of the variable damper 30 is pushed downward, thus causing the front side of the saddle to pivot downward, whereby the center of gravity of the cyclist (the center of gravity due to the weight of the cyclist) is lowered compared to the case in which the cyclist does not apply the rear wheel brake. Thus, it is possible to prevent the rear wheel of the bicycle from fluctuating on the ground even if the cyclist applies the rear wheel brake during high-speed cycling as described above. This further increases the safety of the cyclist.

The specific embodiments of the present invention have been described above. It is to be understood by those skilled in the art, however, that the scope and spirit of the present invention are not limited to these specific embodiments, and that various modifications and changes may be made without departing from the spirit of the present invention.

Therefore, it should be understood that, since the above-described embodiments are provided to assist those skilled in the art in fully understanding the scope of the present invention, the embodiments are to be considered in all respects as illustrative and not restrictive, and the invention is only defined by the scope of the claims.

The invention claimed is:

1. A variable damper seat post comprising:
   a post;
   a seat connecting body coupled to a seat on which buttocks of a cyclist are placed, the seat connecting body being disposed above the post;
   a fixing unit configured to fix the seat connecting body to the post; and
   a damper interposed between the post and the seat connecting body to cause a position of the seat to be varied in response to movement of the buttocks in a state in which the buttocks are placed on the seat,
   wherein the post comprises a damper base forming an upper end thereof, the seat connecting body is disposed above the damper base, and the damper is interposed between the damper base and the seat connecting body so that the seat connecting body and the damper are fixed to the damper base by the fixing unit,
   wherein the fixing unit comprises:
   a front nut mounted in a front nut groove formed in the damper base;
   a front bolt penetrating the seat connecting body and the damper and fastened to the front nut;
   a rear bolt coupled to a rear bolt hole in the damper base; and
   a rear nut fastened to the rear bolt,
   wherein the seat connecting body includes an upper seat connection piece and a lower seat connection piece, and a seat rail provided on a lower surface of the seat is interposed between the upper seat connection piece and the lower seat connection piece,
   wherein each of the lower seat connection piece and the upper seat connection piece of the seat connecting body is provided in a central portion thereof with a lower hole or an upper hole that extends from an upper surface to a lower surface of the corresponding connection piece, and an intermediate bolt is inserted through the lower hole and the upper hole and an intermediate nut is fastened to the intermediate bolt on a lower surface of the seat connecting body so that the intermediate bolt and the intermediate nut constitute a seat connecting body fixing unit, and
   wherein the variable damper seat post causes the seat to move at a time of pedaling such that a right side of the seat tilts downward and a front portion of the seat pivots rightward when a right leg of the cyclist moves down and such that a left side of the seat tilts downward and the front portion of the seat pivots leftward when a left leg of the cyclist moves down.

2. The variable damper seat post according to claim 1, wherein the damper, interposed between the damper base and the seat connecting body, is configured with an elastic member that is pressed when pressing force is applied thereto and returns to an original shape thereof when the pressing force is removed.

3. The variable damper seat post according to claim 1, wherein the front nut is formed in a drum shape (jar shape) in which a diameter thereof gradually decreases from a central portion toward opposite sides and the front nut groove is formed as an elongated groove that extends in a width direction perpendicular to a longitudinal direction of the damper so that a gap having a predetermined width is defined between an outer peripheral surface of the respective ends of the front nut and an inner peripheral surface of the front nut groove when the front nut is mounted in the front nut groove in the damper base, and wherein the variable damper seat post further comprises:
a front washer interposed between a head portion of the front bolt and an upper surface of the seat connecting body and having a dome-shaped lower surface that is in contact with the upper surface of the seat connecting body; and
a rear washer interposed between the rear nut fastened to the rear bolt and the upper surface of the seat connecting body and having a dome-shaped lower surface that is in contact with the upper surface of the seat connecting body.

4. The variable damper seat post according to claim 1, wherein the front nut is formed in a drum shape (jar shape) in which a diameter thereof gradually decreases from a central portion toward opposite sides and the front nut groove is formed as an elongated groove that extends in a width direction perpendicular to a longitudinal direction of the damper so that a gap having a predetermined width is defined between an outer peripheral surface of the respective ends of the front nut and an inner peripheral surface of the front nut groove when the front nut is mounted in the front nut groove in the damper base, and wherein the variable damper seat post further comprises:
a front washer interposed between a head portion of the front bolt and an upper surface of the seat connecting body and having a dome-shaped lower surface that is in contact with the upper surface of the seat connecting body; and
a rear washer interposed between the upper surface of the seat connecting body and a head portion of the rear bolt that is disposed on the upper surface of the seat connecting body and having a dome-shaped lower surface that is in contact with the upper surface of the seat connecting body.

5. The variable damper seat post according to claim 1, wherein the seat connecting body including the upper seat connection piece and the lower seat connection piece is connected to the damper and the damper base by the front nut, the front bolt, the rear bolt, and the rear nut in a state in which the seat rail provided on the lower surface of the seat is interposed between the upper seat connection piece and the lower seat connection piece.

6. The variable damper seat post according to claim 1, wherein the variable damper seat post causes the seat to move such that a rear portion of the seat is lowered to absorb shock generated during cycling and vibration transmitted from a road surface.

7. The variable damper seat post according to claim 6, wherein the seat mounted in the variable damper seat post moves in six directions in response to movement of the cyclist on the seat.

8. The variable damper seat post according to claim 1, wherein the seat mounted in the variable damper seat post moves in six directions in response to movement of the cyclist on the seat.

* * * * *